United States Patent
Jain et al.

(10) Patent No.: US 8,380,763 B2
(45) Date of Patent: Feb. 19, 2013

(54) METHOD AND SYSTEM FOR MANAGING COOKIES IN WEB COMMUNICATIONS

(75) Inventors: Parag Jain, Sunnyvale, CA (US); David Yen Su, Sunnyvale, CA (US); Nicholas Zakas, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 337 days.

(21) Appl. No.: 12/564,867

(22) Filed: Sep. 22, 2009

(65) Prior Publication Data

US 2011/0072223 A1    Mar. 24, 2011

(51) Int. Cl.
*G06F 17/30* (2006.01)
*G06F 7/00* (2006.01)

(52) U.S. Cl. .................................... 707/808; 707/802

(58) Field of Classification Search .................. 707/609, 707/705, 721, 751, 768, 802, 808, E17.112
See application file for complete search history.

(56) References Cited

U.S. PATENT DOCUMENTS

| 6,330,566 B1 * | 12/2001 | Durham | 1/1 |
| 7,379,980 B1 * | 5/2008 | Gilbert | 709/220 |
| 7,933,917 B2 * | 4/2011 | Kim et al. | 707/769 |

* cited by examiner

*Primary Examiner* — Kuen Lu
(74) *Attorney, Agent, or Firm* — Martine Penilla Group, LLP

(57) ABSTRACT

A system and method which may allow a Web application to manage cookies and prevent important data in cookies from being arbitrarily deleted. Cookie data may be separated into a number of tiers according to their importance. When a request to write new data to a cookie is received, the tier to which the new data belongs may be determined and compared to the tier(s) of existing data in the cookie, and existing data may be deleted from the cookie to free room for the new data only when the existing data is not more important than the new data.

20 Claims, 6 Drawing Sheets

METHOD AND SYSTEM FOR MANAGING COOKIES IN WEB COMMUNICATIONS

BACKGROUND

1. Field of the Invention

The present invention relates generally to cookie management in Web communications.

2. Description of Related Art

A cookie is a small text file stored by a Web browser on a user's computer. A cookie may contain information that identifies each user, such as user names and passwords. When a user revisits a Web site, the Web server may establish the user's identity by the cookie.

FIG. 1 illustrates a currently existing network environment in which a cookie management system may be employed. As shown, the system includes a number of Web servers, 101-1, 101-2, . . . 101-n, communicating with a number of user terminals, 102-1, 102-2, . . . 102-n, over the Internet 103. A user may want to visit his homepage on a Web site run by a Web server 101-n. The user may sign in from the login screen of the Web site. When redirecting the user from the login screen to his homepage, the Web server 101-n may send to a Web browser in the user terminal 102-n, along with everything else for the user's homepage, a header "set cookie: login=1." The Web browser may store the cookie on the user terminal 102-n. If the user is interested in an article on his homepage, he may click on the link for the article, and the Web browser may send to the Web server 101-n a request for the article, together with the cookie "login=1". The Web server 101-n may identify the user by the cookie and realize that he already signed in, and not ask him to sign in again.

Cookies have finite limits defined by Web browsers, both on the number of cookies being used and the overall cookie size. When these limits are exceeded, Web browsers start deleting data stored in cookies. Different Web browsers have different limits on cookies, and follow different rules to determine which data to delete. A user's browsing experience may be affected when important data, e.g., login information, is deleted.

Therefore, it may be desirable to provide a system and method which allows Web applications to determine which data should be deleted from cookies to ensure that the most important data always remains safe.

BRIEF DESCRIPTION OF THE DRAWING FIGURES

Embodiments of the present invention are described herein with reference to the accompanying drawings, similar reference numbers being used to indicate functionally similar elements.

FIGS. 3A and 3C illustrate a flow chart of a method for managing cookies according to another embodiment of the present invention.

DETAILED DESCRIPTION

The present invention provides a system and method which may allow a Web application to manage cookies and prevent important data in cookies from being arbitrarily deleted. Cookie data may be separated into a number of tiers according to their importance. When a request to write new data to a cookie is received, the tier to which the new data belongs may be determined and compared to the tier(s) of existing data in the cookie, and existing data may be deleted from the cookie to free room for the new data only when the existing data is not more important than the new data. The invention may be carried out by computer-executable instructions, such as program modules. Advantages of the present invention will become apparent from the following detailed description.

In one embodiment, a three-tier system may be used. The first tier may include the most important data that would severely disrupt the user experience should it be removed. The first tier may include cookie data for user settings, e.g., users' login information and users' selection of their homepage content. The first tier may also include geographic information or contact information. The second tier may include the second most important data, the loss of which might affect the user experience but not so much that it would severely impact the user. The second tier may include cookie data for page-level settings related to the state of the overall page, e.g., themes. The third tier may be the least important data, which may be related to the state of a small section on the page and the user may not notice if it's missing. The third tier may include cookie data for module-level settings, e.g., which tab was selected in a tabset. It should be understood that the cookie data may be separated into more or fewer tiers. The more the tiers that are accommodated, the less likely it may be that existing cookie data will be replaced by less important new data.

Figure 1:
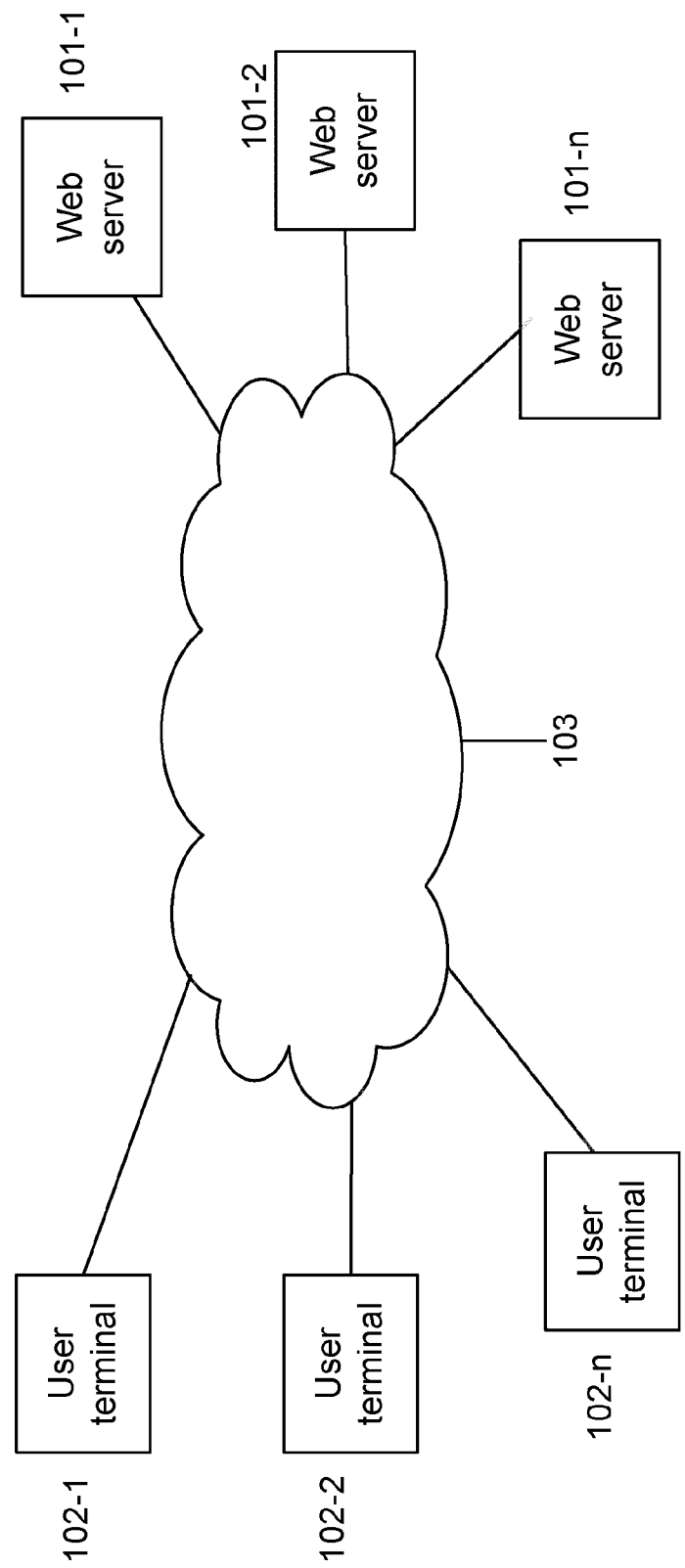
FIG. 1 illustrates a currently existing network environment in which a cookie management system may be employed.
Figure 2:
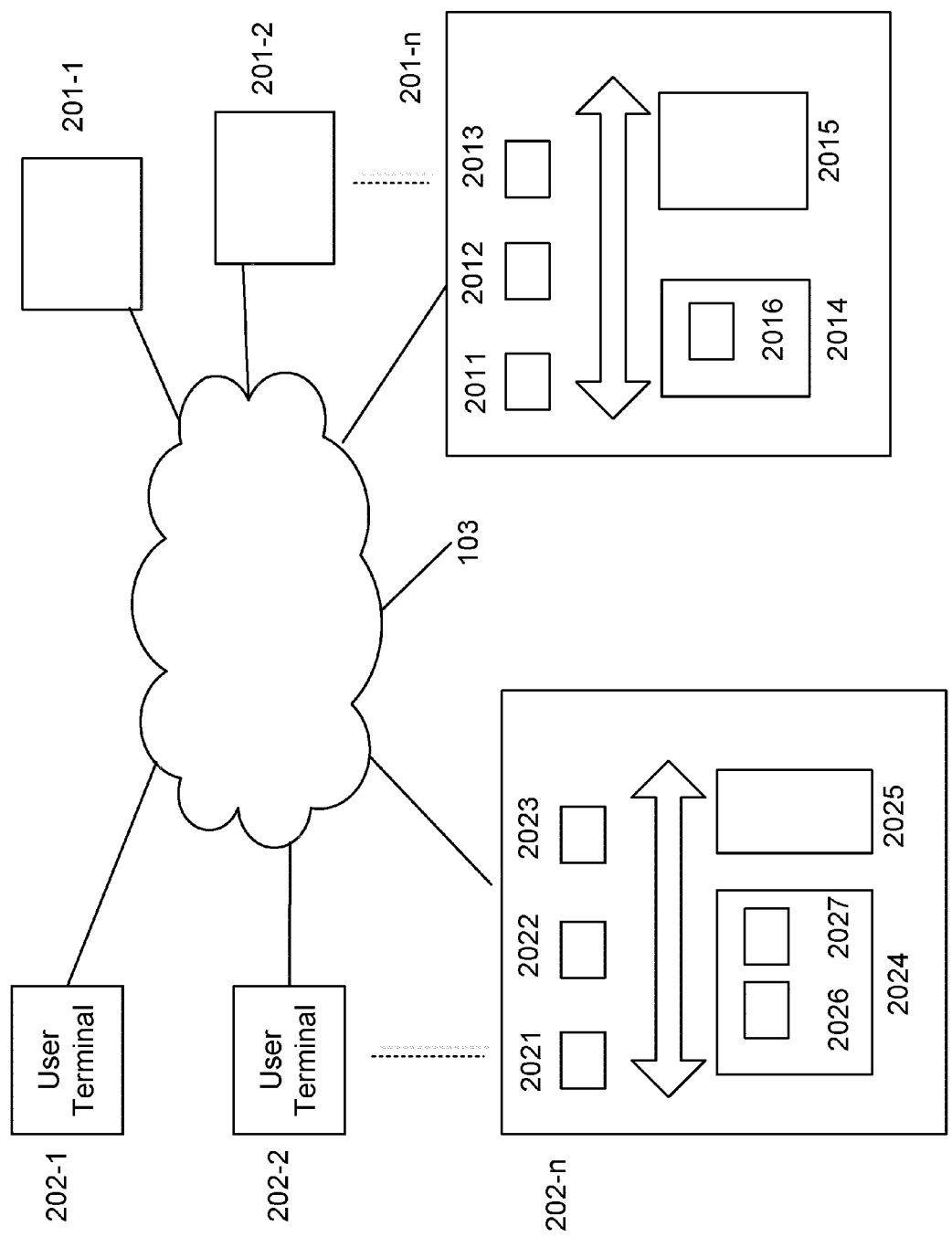
FIG. 2 illustrates a system for managing cookies according to one embodiment of the present invention.

FIG. 2 illustrates a system for managing cookies according to one embodiment of the present invention. Web servers 201-1, 201-2, . . . and 201-n may communicate with user terminals 202-1, 202-2, . . . and 202-n over a network 103. A Web server 201-n may be a computer system and may control the operation of a Web site, which may provide a certain type of service, e.g., online shopping, online auction, social networking or online photo albums. The Web server 201-n may include one or more of a processing unit 2011, a display screen 2012, an input device 2013, memory devices 2014 and 2015, and a system bus coupling various components in the computer system.

The memory device 2015 may store data relevant to the service provided by a Web server 201-n, e.g., information about items to be sold, items to be auctioned, people in a social network or photos in online photo albums. The memory device 2015 may also store user information, e.g., users' browsing history.

Figure 3A:
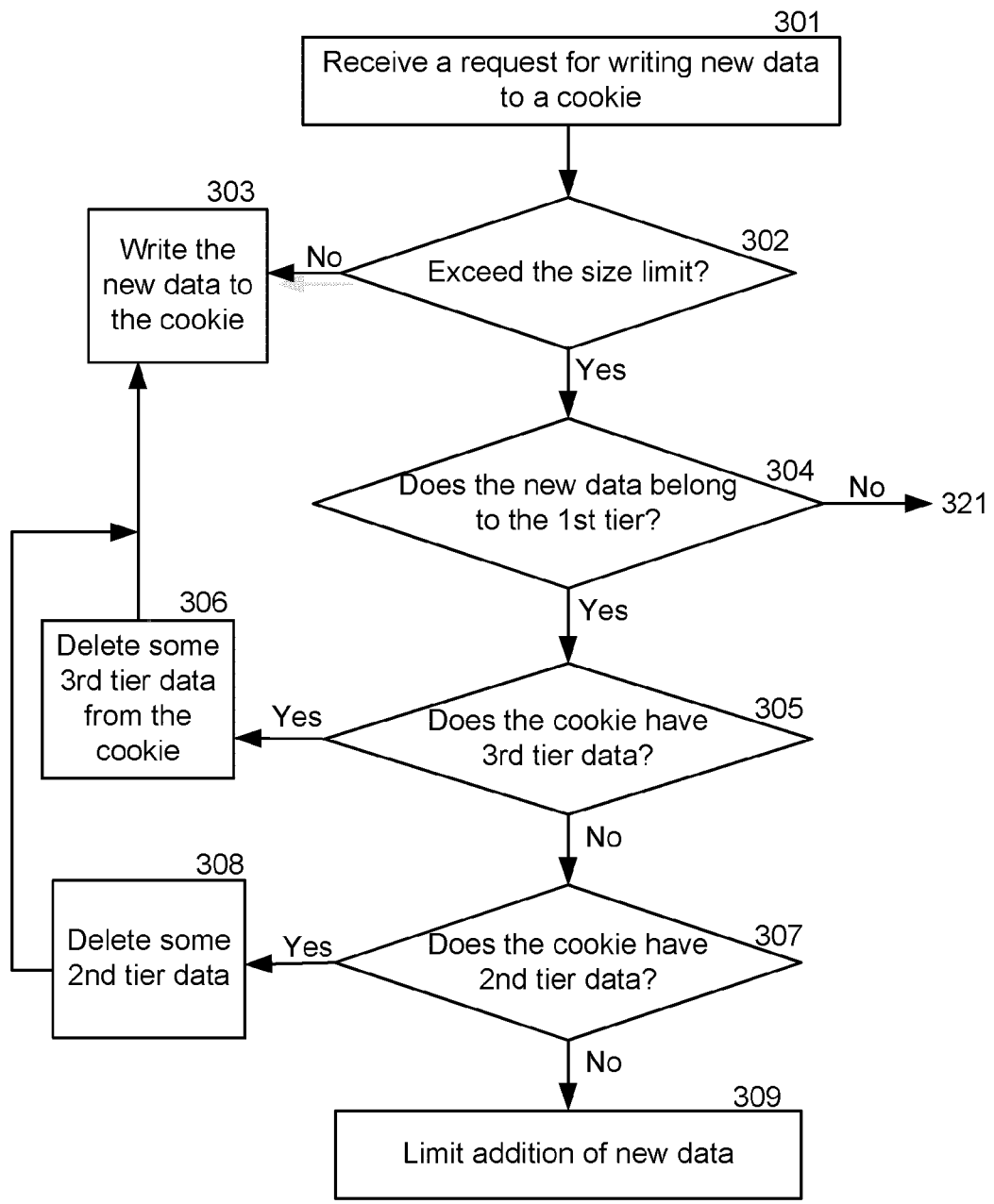
FIGS. 3A and 3B illustrate a flow chart of a method for managing cookies according to one embodiment of the present invention.
Figure 3B:
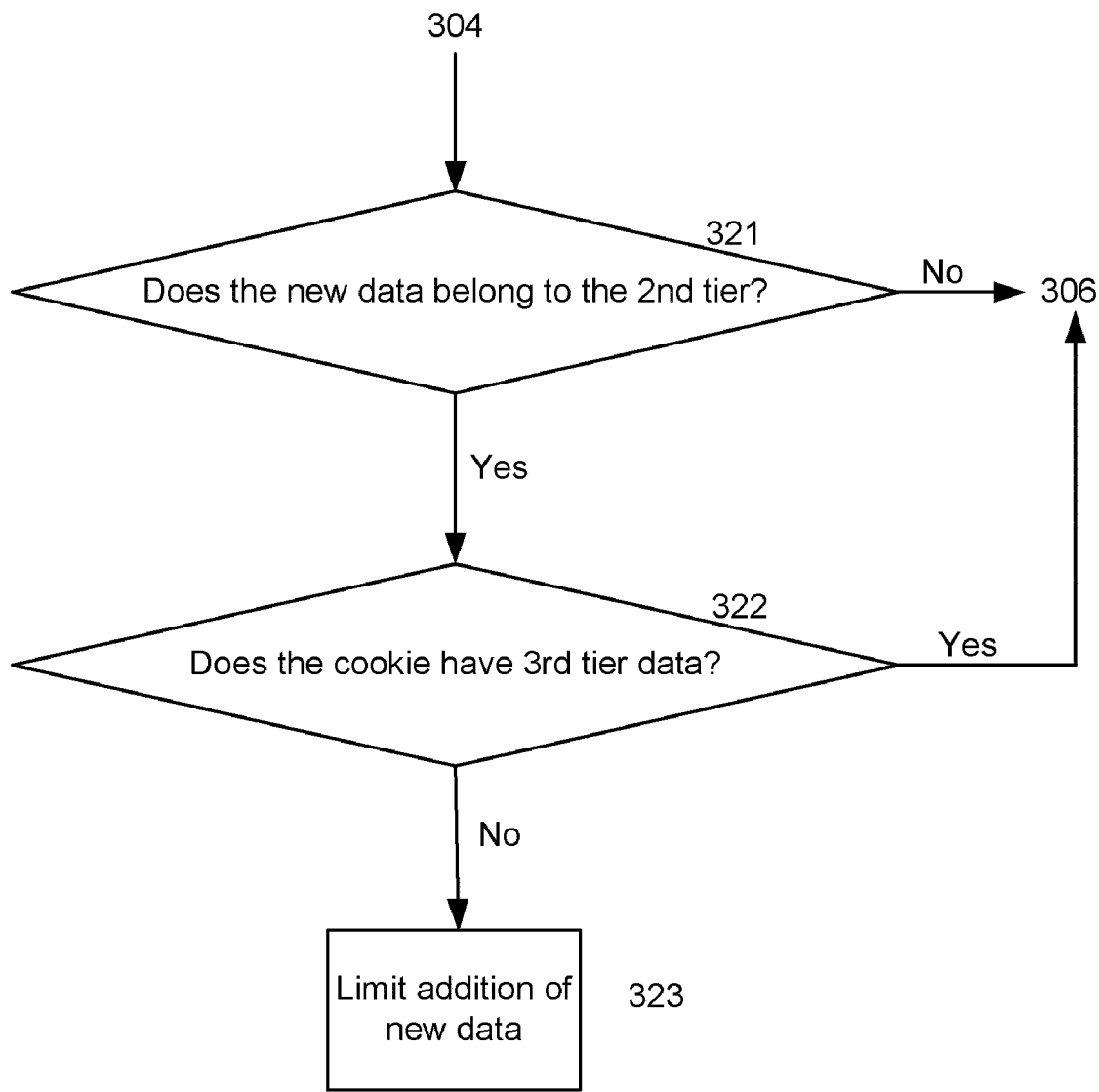
Figure 4:
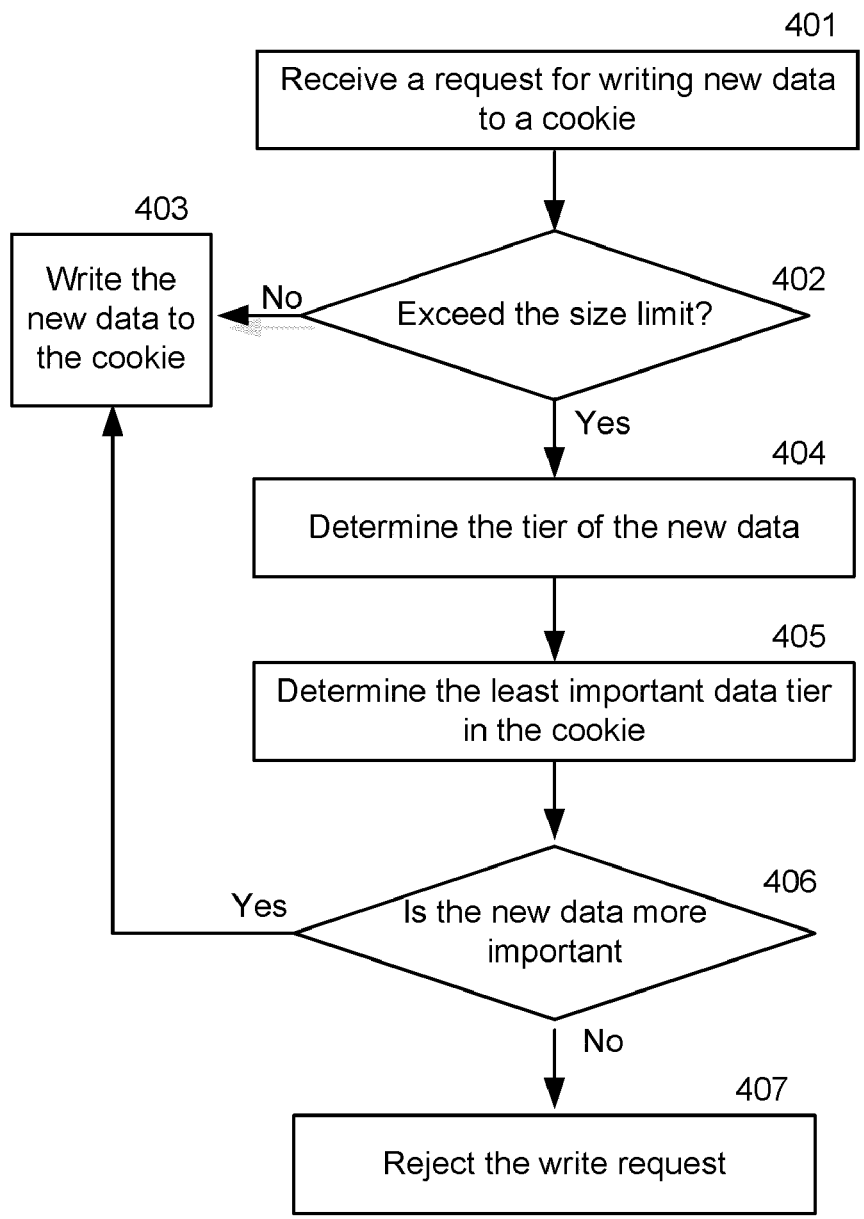
FIG. 4 illustrates a flow chart of a method for managing cookies according to one embodiment of the present invention.

A cookie management module 2016, which may be an Application Programming Interface (API), may be stored in one of the memory devices, e.g., the memory device 2014, for performing the process shown in FIGS. 3A-3B or 4. The cookie management module 2016 may receive requests to write new data to a cookie and make sure that the new data will not risk the loss of important data in the cookie. The request may be written with, e.g., pre hypertext processor (PHP) language or other suitable code. If adding the new data may cause the cookie to exceed its size limit, the cookie management module 2016 may determine which tier the new data belongs to, and only delete data in the cookie belonging to a tier which is not more important than the tier of the new data.

User terminals 202-n may be personal computers, handheld or laptop devices, microprocessor-based systems, set top boxes, or programmable consumer electronics. The user terminal 202-n may include one or more of a processing unit 2021, a display screen 2022, an input device 2023, memory devices 2024 and 2025, and a system bus coupling various components in the computer system. Each user terminal may have a browser application 2026 configured to receive and display Web pages, which may include text, graphics, multimedia, etc. The browser 2026 may store cookies from a Web server 201-*n* on the user terminal 202-*n*, e.g., in the memory device 2025. The Web pages may be based on, e.g., HyperText Markup Language (HTML) or extensible markup language (XML). A cookie management module 2027, which may be JavaScript™, may perform the process shown in FIGS. 3A-3B or 4.

Cookies stored in the memory device 2025 may include, e.g., users' login information, geographic information, preferences, etc. It should be understood that the memory device 2025 may be internal or external.

Network connectivity may be wired or wireless, using one or more communications protocols, as will be known to those of ordinary skill in the art.

FIGS. 3A and 3B illustrate the operation of the server side cookie management module 2016 according to one embodiment of the present invention. The method may be used in the system shown in FIG. 2. In this embodiment, cookie data may be separated into three tiers. The first tier may be for the most important data, e.g., user settings; the second tier may be for the second most important data, e.g., page-level settings; and the third tier may be for the least important data, e.g., module-level settings and all data that do not fall into the first or second tier.

At 301, the cookie management module 2016 may receive a request, from the processing unit 2011 or the input device 2013, to write new data to a cookie.

At 302, the cookie management module 2016 may determine whether the addition of the new data will cause the cookie to exceed its size limit.

If not, the new data may be added to the cookie at 303. The updated cookie may then be sent to a Web browser in a user terminal 202-*n* and be stored therein.

If the cookie may exceed its size limit, the cookie management module 2016 may determine whether the new data belongs to the highest data tier, the first tier in this embodiment, at 304. If not, the process may proceed to 321 in FIG. 3B.

If the new data belongs to the first tier, the cookie management module 2016 may determine whether the cookie has third tier data at 305. If yes, at 306, the cookie management module 2016 may delete some third tier data from the cookie to free room for the new data, which belongs to the first tier and is more important. The process may then proceed to 303 to write the new data to the cookie.

If it is determined at 305 that there is no third tier data in the cookie, the cookie management module 2016 may determine whether the cookie has second tier data at 307. If yes, at 308, the cookie management module 2016 may delete some second tier data from the cookie to free room for the new data which is more important. The process may then proceed to 303 to write the new data to the cookie.

If it is determined at 307 that there is no second tier data in the cookie, additions of new data to the cookie may be limited, since all data in the cookie belongs to the first tier and needs to be protected. In one embodiment, at 309, the cookie management module 2016 may reject the request for writing new data to the cookie.

If it is determined at 304 that the new data does not belong to the first tier, it may be determined at 321, in FIG. 3B, whether the new data belongs to the second tier. If not, the new data must belong to the third tier. Since the third tier data is the least important and users may not notice if it is missing, in one embodiment, the cookie management module 2016 may be configured to allow deleting existing third tier data for new third tier data. Accordingly, the process may proceed to 306 to delete some third tier data in the cookie to free room for the new data, and then to 303 to write the new data.

If it is determined at 321 that the new data belongs to the second tier, it may be determined at 322 whether the cookie has third tier data at 322. If yes, the process may proceed to 306 to delete some third tier data from the cookie to free room for the new data, and then to 303 to write the new data.

In one embodiment, the cookie management module 2016 may be configured to allow addition of new data to a cookie only when the new data is more important than existing data in the cookie. So if there is no third tier data in the cookie, both the new data and the least important data in the cookie belong to tier two, and the cookie management module 2016 may reject the write request at 323 to protect data already existing in the cookie.

Figure 3C:
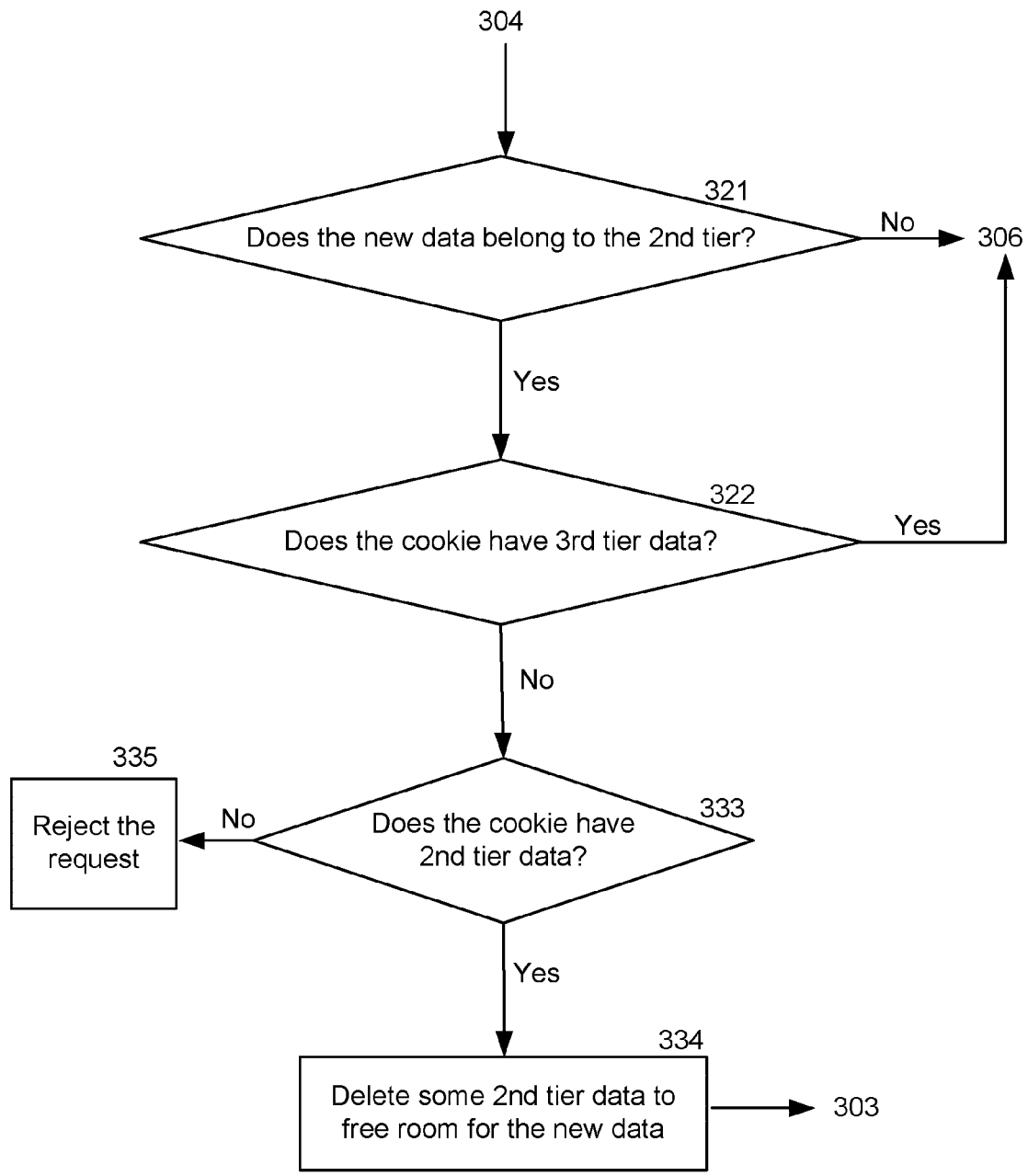

Since the loss of the second tier data may not severely impact a user's browsing experience, in an embodiment shown in FIG. 3C, the cookie management module 2016 may be configured to allow addition of new data to a cookie when both the new data and the least important data in the cookie belong to tier two. So if the cookie does not have third tier data, the cookie management module 2016 may determine whether the cookie has second tier data at 333. If yes, at 334, the cookie management module 2016 may delete some second tier data from the cookie to free room for the new data, and write the new data to the cookie at 303. If there is no second tier data in the cookie, the cookie management module 2016 may reject the write request at 335, since all data in the cookie must belong to the first tier, which is the most important data and needs to be protected.

The cookie management module 2016 may facilitate user terminal side cookie management via communication with the cookie management module 2027, which may be, e.g., JavaScript™. The cookie management module 2027 may control data addition to and deletion from a cookie, in a way similar to the flowcharts shown in FIGS. 3A-3B or 3C. For example, a user may want to change the theme of his home page, which is the second tier data, through his browser and the cookie management module 2027 may receive the request. If the cookie has third tier data, at 306, the cookie management module 2027 may delete some third tier data to free room for the theme change. However, if the cookie is fully occupied by the first tier data, the cookie management module 2027 may limit the addition of new data at 323, e.g., by informing the user that there is not enough room in the cookie for the change.

Since a user may change his settings via a browser in a user terminal, the cookie management module 2027 may give high priority to the user's input, and may be configured to follow the flowchart shown in FIG. 3C, so that some second tier data may be deleted to free room for the new data.

FIGS. 3A-3B and 3C are only used to illustrate a cookie management method of the present invention, and are not intended to limit the sequence of operations performed by the cookie management module 2016. For example, instead of determining the tier of the new data at 304 and 321 and finding out the lowest data tier in the cookie at 305, 307, 322, and 401, the cookie management module 2016 may directly compare the tier of the new data and the least important data tier in the cookie and permit a write request only when the new data is more important. Specifically, as shown in FIG. 4, the cookie management module 2016 may receive a request to write new data to a cookie at 401, and determine whether the addition of the new data may exceed the size limit of the cookie at 402. If not, the cookie management module 2016 may write the new data to the cookie at 403. If the cookie size limit may be exceeded, the cookie management module 2016 may determine the tier of the new data at 404 and the least important data tier in the cookie at 405. At 406, the cookie management module 2016 may compare the tier of the new data and the least important data tier in the cookie. If the new data is more important, the cookie management module 2016 may write the new data to the cookie at 403. Otherwise, at 407, the cookie management module 2016 may reject the write request.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for managing cookie data, said method comprising:
   receiving a request for writing new data to a cookie to be stored in a user terminal;
   determining whether addition of the new data will cause the cookie to exceed a size limit; and
   determining whether the cookie has existing data which is not more important than the new data, wherein importance involves classifying the existing data and the new data between being user settings, page-level settings, and other.

2. The method of claim 1, further comprising:
   deleting the existing data from the cookie only when the existing data is not more important than the new data, so as to protect important existing data in the cookie.

3. The method of claim 2, further comprising:
   separating cookie data into at least two tiers according to how important the cookie data is, wherein data in a first tier is more important than data in a second tier.

4. The method of claim 3, further comprising:
   determining which tier the new data falls into.

5. The method of claim 4, further comprising:
   rejecting the request if the new data belongs to the second tier but the cookie is fully occupied by existing data in the first tier.

6. The method of claim 4, further comprising:
   when the new data belongs to the first tier but the cookie has existing data in the second tier, deleting some second tier data to free room in the cookie for the new data and writing the new data to the cookie.

7. The method of claim 4, further comprising:
   when the new data belongs to the second tier and the cookie has existing data in the second tier, deleting some second tier data in the cookie to free room for the new data.

8. The method of claim 4, wherein the first tier data comprises user settings.

9. The method of claim 4, wherein the second tier data comprises page-level settings.

10. The method of claim 4, further comprising:
    determining the tier of the least important data in the cookie.

11. The method of claim 10, further comprising:
    comparing the tier of the new data and the tier of the least important existing data in the cookie.

12. The method of claim 11, further comprising:
    writing the new data to the cookie only when the new data is more important than the least important existing data in the cookie.

13. A system comprising:
    a memory device for storing cookies; and
    a cookie management module which:
      receives a request for writing new data to a cookie to be stored in the memory device;
      determines whether addition of the new data will cause the cookie to exceed a size limit; and
      determines whether the cookie has existing data which is not more important than the new data, wherein importance involves classifying the existing data and the new data between being user settings, page-level settings, and other.

14. The system of claim 13, wherein the cookie management module deletes the existing data from the cookie only when the existing data is not more important than the new data, so as to protect important data in the cookie.

15. The system of claim 14, wherein the cookie data is separated into at least two tiers according to how important the cookie data is, wherein data in a first tier is more important than data in a second tier.

16. The system of claim 15, wherein the cookie management module determines which tier the new data falls into.

17. The system of claim 16, wherein the cookie management module rejects the request if the new data belongs to the second tier but the cookie is fully occupied by existing data in the first tier.

18. The system of claim 16, wherein when the new data belongs to the first tier but the cookie has existing data in the second tier, the cookie management module deletes some second tier data to free room in the cookie for the new data and writes the new data to the cookie.

19. The system of claim 16, wherein the cookie management module
    determines the tier of the least important existing data in the cookie;
    compares the tier of the new data and the tier of the least important existing data in the cookie; and
    writes the new data to the cookie only when the new data is more important.

20. A computer program stored in a non-transitory computer-readable medium having instructions which, when performed by a computer, perform a method for managing cookies, said method comprising:
    receiving a request for writing new data to a cookie to be stored in a user terminal;
    determining whether addition of the new data will cause the cookie to exceed a size limit; and
    determining whether the cookie has existing data which is not more important than the new data, wherein importance involves classifying the existing data and the new data between being user settings, page-level settings, and other.

* * * * *